United States Patent [19]

Brickner et al.

[11] 4,452,117
[45] Jun. 5, 1984

[54] SELF-ADJUSTING FENCE FOR MOTORIZED SAW UNIT

[75] Inventors: Louis D. Brickner, Pittsburgh, Pa.; Clifford P. Rickmers; Bobby B. Donovan, both of Tupelo, Miss.

[73] Assignee: Rockwell International Corporation, Pittsburgh, Pa.

[21] Appl. No.: 367,814

[22] Filed: Apr. 12, 1982

[51] Int. Cl.³ ............................................. B27B 5/24
[52] U.S. Cl. .................................. 83/467 R; 83/471.3; 83/581
[58] Field of Search ................. 83/471.3, 473, 477.1, 83/486, 581, 467 R, 468, 491, 394, 441, 438, 373; 144/286 R; 269/303, 304, 315, 320

[56] References Cited

U.S. PATENT DOCUMENTS

| | | | |
|---|---|---|---|
| 3,302,669 | 2/1967 | Edler | 83/471.3 |
| 3,384,135 | 5/1968 | Frydenlund | 83/471.3 |
| 4,152,961 | 5/1979 | Batson | 83/471.3 |
| 4,211,134 | 7/1980 | Thorsell et al. | 83/471.3 |
| 4,355,557 | 10/1982 | Melsey | 83/581 |

*Primary Examiner*—James M. Meister
*Assistant Examiner*—J. L. Knoble

[57] ABSTRACT

A motorized saw for cross-cutting and mitering elongated workpieces mounted for sliding movement on a pair of spaced parallel guide rods supported by spaced trunnions attached to the ends of a support arm. The support arm is rotatably mounted intermediate its ends on a frame and has a worktable fixed thereon which includes a cutting channel that defines the pathway of travel of the saw. A pair of aligned fence members have their adjacent ends disposed in close proximity with the cutting channel and by means of a link rod operatively connected to each fence member and support arm, the fence members automatically adjust themselves to the cutting channel on selective movement of the support arm to a position for effecting a desired angle cut by the saw.

9 Claims, 7 Drawing Figures

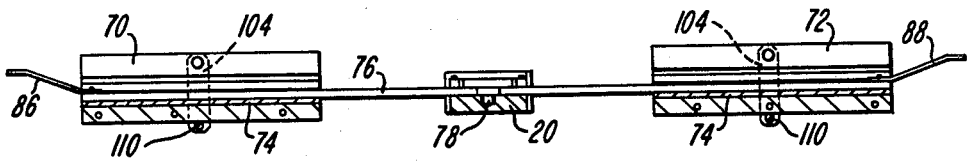
FIG. 3
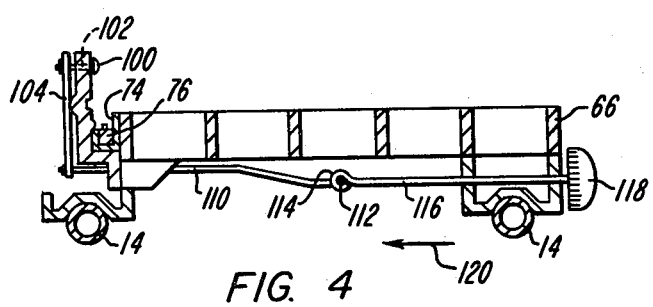
FIG. 4
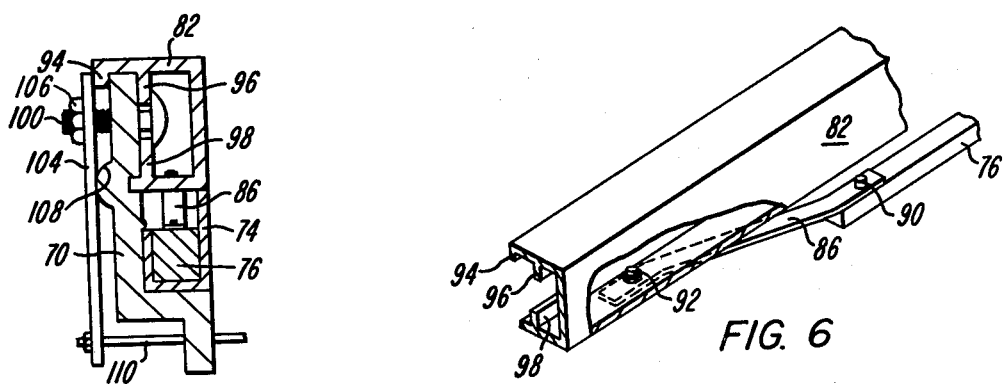
FIG. 5
FIG. 6
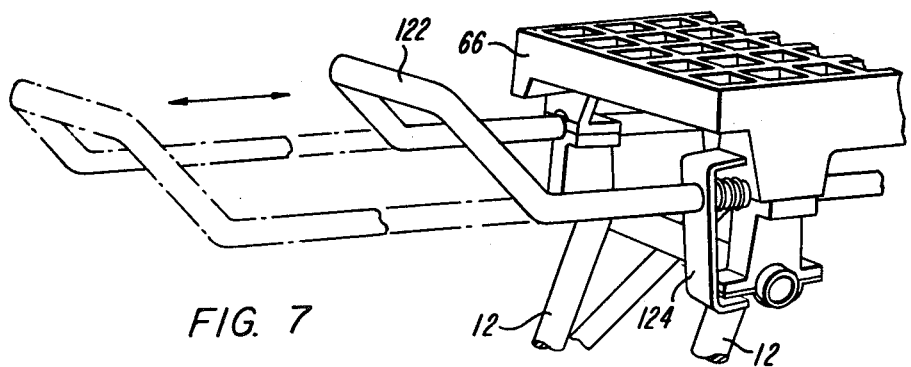
FIG. 7

4,452,117

SELF-ADJUSTING FENCE FOR MOTORIZED SAW UNIT

BACKGROUND OF THE INVENTION

The invention pertains to a motorized saw unit of the bias-cutting type which can be selectively set for cross-cutting and mitering elongated workpiece. Additionally the unit includes fence members that automatically align themselves in operative association with the saw when the latter is being positioned to form a predetermined angular cut.

A number of U.S. patents show and describe power saw units for cross-cutting and mitering workpieces and for reference to the teachings of such disclosures, attention is hereby drawn to U.S. Pat. Nos. 3,971,274, 4,152,961 and 4,211,134.

U.S. Pat. No. 4,211,134 is a saw unit of the radial arm type and is provided with a single fence member of the self-aligning type.

SUMMARY OF THE INVENTION

The motorized saw unit according to the present invention includes a supporting frame having a horizontal support arm mounted for selective rotatable movement thereon. The ends of this support arm are each provided with an upwardly directed trunnion member that includes integral boss elements adapted to fixedly support the ends of a pair of spaced parallel guide rods. The guide rods define track elements for slidably supporting the motorized saw. A worktable is fixed on and for rotative movement with the support arm and is provided with a cutting channel which the saw is caused to follow during the performance of its intended function. A link rod is operatively connected intermediate its ends with the support arm and is caused to move longitudinally during selective rotation of the support arm. A pair of aligned fence members have their adjacent ends disposed in operative association with the cutting channel and their opposite ends are operatively connected to the link rod which effects simultaneous movement of the fence members whereby their adjacent ends are maintained in operative association or close proximity with the cutting channel during selective rotative movement of the support arm.

It is a general object of the invention to provide a motorized saw unit for cross-cutting and mitering elongated workpieces having a pair of self-aligning fence members.

It is a further object to provide a saw unit having a worktable with a cutting channel that defines the pathway of the saw regardless of its selected angular setting.

Another object is to provide such a saw that is readily collapsible and movable from one location to another.

These and other objects of the present invention will become more fully apparent by reference to the appended claims and as the following detailed description proceeds in reference to the figures of drawing wherein:

BRIEF DESCRIPTION OF THE DRAWINGS

FIG. 3 is a sectional view as seen looking in the direction of the indicating arrows of line 3—3 in FIG. 2.

FIG. 4 is a sectional view as seen looking in the direction of the indicating arrows of line 4—4 in FIG. 2;

FIG. 5 is a sectional view showing the relationship of the link rod, fence member and fence member support;

FIG. 6 is a perspective view showing the operating connection between the link rod and one of the fence members; and FIG. 7 is a perspective view of one end of the saw unit showing a workpiece support extension.

DESCRIPTION OF THE PREFERRED EMBODIMENT

Figure 1:
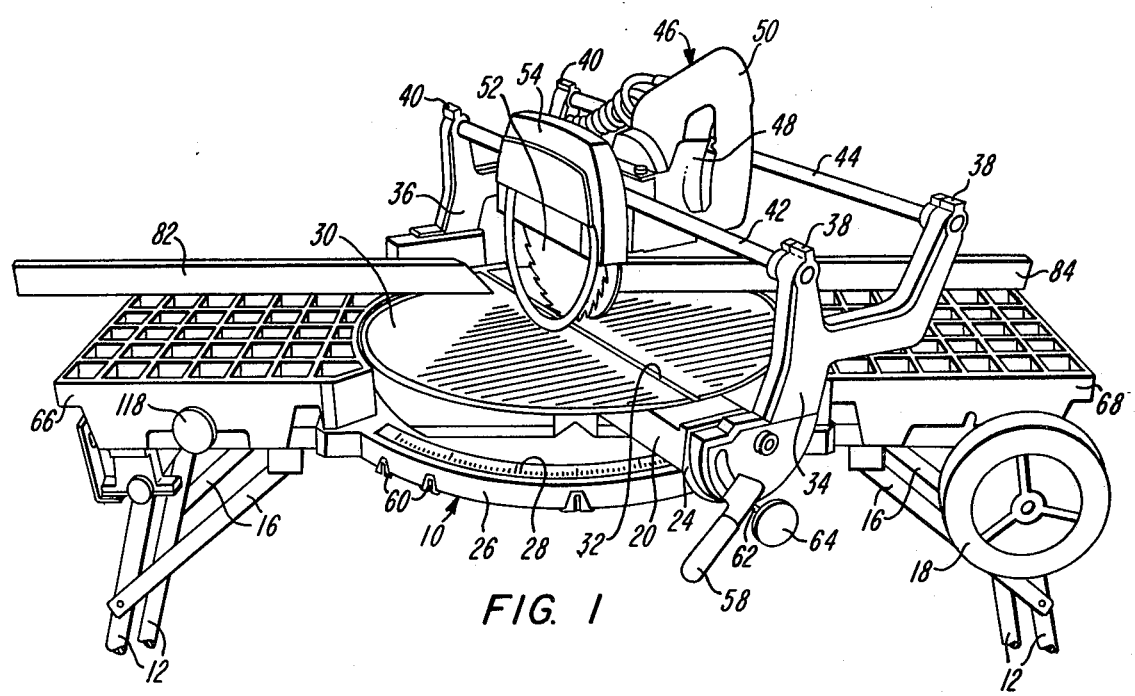
FIG. 1 is a perspective view of the motorized saw according to the invention.

Referring now to FIG. 1 the motorized saw unit according to the invention is identified generally by numeral 10. The saw includes a supporting frame consisting of tubular members 12 and 14 and bar members 16 (FIGS. 1 and 4). The tubular members 14 are horizontally disposed and those identified by numeral 12 depend from the underside of the unit defining legs and with the assistance of the bar members 16 the latter tubular members can be folded so that the unit can be transported from one location to another by means of a pair of wheel members 18 (one only shown in FIG. 1) rotatably mounted on the supporting frame.

Figure 2:
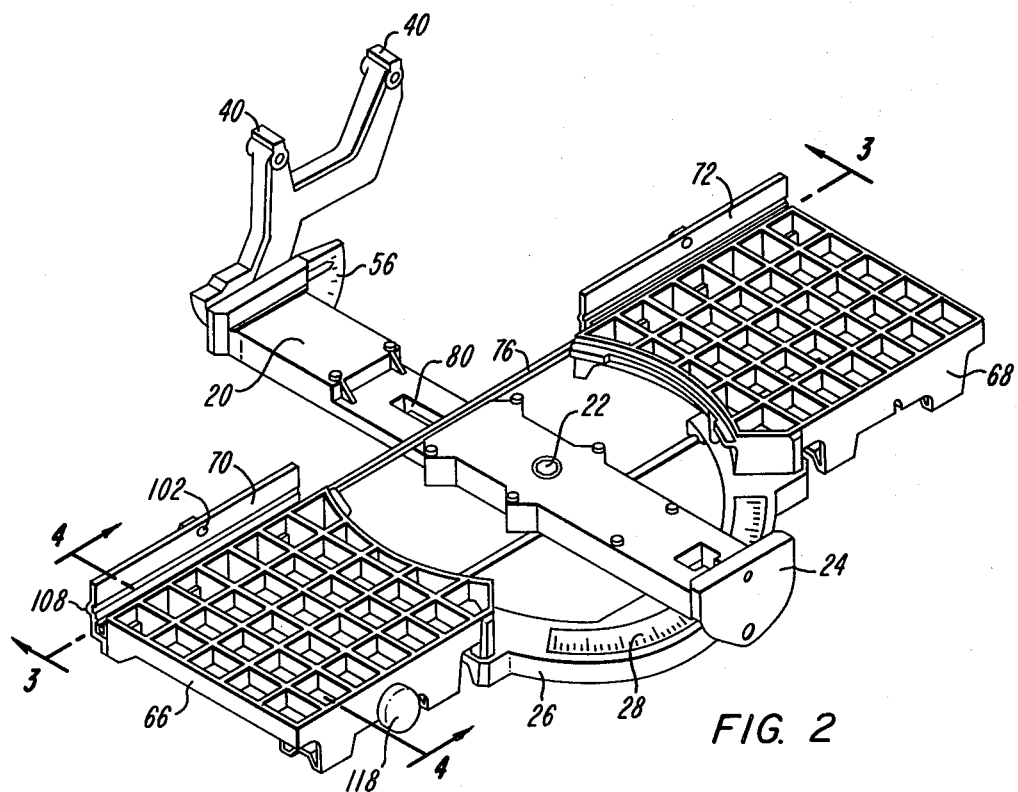
FIG. 2 is a perspective view of a portion of the saw shown in FIG. 1.

With reference to FIG. 2, the saw unit includes a horizontally disposed support arm 20 that is mounted for selective rotatable movement intermediate its ends as at 22. The forward end of the support arm 20 is identified in FIGS. 1 and 2 by numeral 24 and that portion of said support arm immediately adjacent to said forward end is disposed in close proximity with a miter indexing plate 26 having an arcuated band of mitering indicia 28.

Referring again to FIG. 1, the upper surface of the support arm 20 has a circular worktable 30 fixed thereon which is provided with a cutting channel 32 that is in alignment with the longitudinal axis of the support arm 20. Each end of the support arm 20 has a trunnion member mounted for pivotal movement thereon with the forward trunnion member being identified by numeral 34 and the rear one by numeral 36. These trunnion members are in alignment one with the other and both are provided with integral boss members 38 and 40 respectively which serve to anchor the ends of a pair of spaced and parallel guide rods 42 and 44. The guide rods 42 and 44 define track elements for slidably supporting a motorized saw identified generally in FIG. 1 by numeral 46. Among its numerous parts, the saw 46 includes a drive motor 48, a handle 50 for effecting manual movement of the saw along the guide rods 42 and 44. Additionally the saw is provided with a cutting blade 52 and a well known form of blade guard 54.

With reference to FIG. 2, the rear trunnion member 36 is operatively associated with an arcuate band of indicating indicia or bevel scale 56 and the forward trunnion member 34 (FIG. 1) being connected to the rear one by guide rods 42 and 44 provides a means whereby they move in unison when selectively pivoted. As shown in FIG. 1, the forward trunnion member 34 has a bevel clamp lever 58 operatively associated therewith and serves to lock the trunnion members 34 and 36 in any angular setting selected on the bevel scale 56. With the worktable 30 being movable with the support arm 20, and the trunnion members pivotably attached to each end of said support arm, the cutting blade 52 is always disposed in operative association with the cutting channel 32 regardless of the mitering position of said worktable or angular setting of said trunnion members.

Referring again to FIG. 1 the miter indexing plate 26 is provided with automatic positioning stops 60 for the support arm 20 at the more common saw mitering positions and is locked in these positions when selected by a spring biased pin 62 having a control knob 64 fixed on the outer end thereof.

Worktable extensions 66 and 68 are mounted on the supporting frame on each side of and in close proximity with the worktable 30. Each of these worktable extensions 66 and 68 has a fence support member attached to the rear side thereof which are identified in FIG. 2 by numerals 70 and 72 respectively. In cross section, these fence support members 70 and 72 have a stepped configuration (FIGS. 4 and 5) and provide a means for the assembly of a channel guide 74 intermediate the rear side of the worktable extensions and the upwardly directed inner surface of the fence support members 70 and 72. These channel guides 74 are adapted to slidably support the end portions of a link rod 76 as shown in FIGS. 2 and 3. The link rod 76 intermediate its ends is provided with a depending roller 78 (FIG. 3) which is adapted to ride within a channel 80 (FIG. 2) formed in the support arm 20. This channel 80 extends along a portion of the longitudinal axis of the support arm 20 as shown in FIG. 2 and any selective rotative movement of said support arm causes longitudinal movement of the link rod 76 within the channel guides 74.

A pair of spaced and aligned fence members 82 and 84 are mounted for simultaneous sliding movement on the worktable 30 and its associated worktable extensions 66 and 68. These fence members 82 and 84 are moved longitudinally and simultaneously by means of fence link levers 86 and 88 respectively which interconnect said fence members with opposite ends of the link rod 76. As shown in FIG. 6, one end of fence link lever 86 assembles on a pin 90 attached to the link rod 76 and the opposite end of said fence link lever is fixed to the underside of the fence member 82 by means of a bolt 92. Although not shown, it should be understood that fence link lever 88 interconnects the opposite end of the link rod 76 with the fence member 84 in the same manner as fence link lever 86 is connected to fence member 82.

With the fence members 82 and 84 connected to the link rod 76 as described supra, it is obvious that said fence members are longitudinally and simultaneously moved with each selective rotative movement of the support arm 20. The fence members are extruded as shown in FIGS. 5 and 6 and are guided during their longitudinal movement in close proximity with their respective fence support member by means of a depending lip 94 disposed in engagement with the upper rear surface of said fence support member. Additionally each fence member includes a pair of vertically spaced and aligned rib members 96 and 98 (FIGS. 5 and 6) which serve to hold the fence member in close proximity with their respective fence supports by means of a round head bolt 100 as shown in FIG. 5. The head of this bolt 100 is caused to engage the vertical inner surfaces of the rib members 96 and 98 with the shank and thread portion thereof extending rearwardly through an assembly hole 102 (FIGS. 2 and 4) provided in the rear vertically extending surfaces of the fence support members 70 and 72. Bolt member 100 also serves as a means for placing each fence member (82, 84) in locking engagement with its respective fence support member. This locking feature is accomplished by means of a locking lever 104 assembled on the threaded portion of the bolt 100 by means of a nut 106 (FIG. 5). This locking lever extends in a downwardly direction and at a point intermediate its ends it engages a bulbous rib 108 formed on rear side of the fence support members. The locking lever 104 adjacent its lower end is operatively connected to a linkage rod 110 which in turn is connected to a linkage rod 112 (FIG. 4) having offset portions (not shown) that define cranks on which the eye portion 114 of an actuating linkage rod 116 is assembled. The end of rod 116 opposite the eye portion 114 is provided with a control knob 118. By pushing the control knob 118 in the direction of the indicating arrow 120 in FIG. 4, rotates the crank portions of rod 112 past center causing rod 110 to pull the lower end of the locking levers 103 inwardly causing a pivoting action on the bulbous rib 108. This pivoting action causes the head of the bolt 100 to pull the fence members (82, 84) into locking engagement with their respective fence support members.

Referring now to FIG. 7 the worktable extension has a tubular extendable wing member 122 operatively associated therewith which serves as means for accommodating elongated workpieces of excessive length. This extendable wing member includes a spring biased locking bar 124 for maintaining it in any desired location. Additionally the extendable wing member 122 serves as a means for manually manipulating the saw unit on its wheel members 18 to effect transporting the same from one location to another.

Although the present invention has been described in connection with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

We claim:

1. A motorized saw for cross-cutting and mitering elongated workpieces, said saw comprising:
   (a) a supporting frame;
   (b) a support mounted for selective rotation on said supporting frame;
   (c) means interconnecting the ends of said support arm defining track elements for slidably supporting the motorized saw;
   (d) a worktable fixed on said support arm which includes an elongated cutting channel extending parallel with said track element and defining the pathway of the saw;
   (e) a pair of spaced table extensions disposed on each side of and in close proximity to said worktable;
   (f) a fence support fixed on one side of each said table extension;
   (g) guide means supported by said fence supports for maintaining said fence members in close proximity with said fence supports;
   (h) a pair of spaced and aligned fence members mounted for sliding movement on said worktable and having adjacent ends disposed in operative association with said cutting channel; and
   (i) means operatively connecting said support arm and said fence members for moving said fence members simultaneously to maintain adjacent ends thereof in operative association with said cutting channel upon rotation of said support arm to selectively change the angular setting of said channel and the cutting angle of the saw.

2. The structure according to claim 1 wherein said interconnecting means includes:

(a) a trunnion member mounted for selective pivotal movement on each end of said support arm.

3. The structure according to claim 1 wherein one of said trunnion members includes an arcuated band of indicating indicia and the other said trunnion member includes a combined release and locking lever for selectively positioning said guide rods and the saw carried thereby as desired in accordance with said indicating indicia.

4. The structure according to claim 1 wherein one end of said support arm is disposed in operative association with a stationary indexing plate having:

(i) an arcuated band of mitering indicia for selectively positioning said cutting channel to effect cutting a workpiece at a preselected angle.

5. The structure according to claim 1 wherein said moving means includes:

(a) a link rod operatively connected to said support arm for linear movement during selective rotative movement of the latter; and (b) means interconnecting the ends of said link rod with said fence members for effecting simultaneous linear movement thereof with said link rod.

6. The structure according to claim 5 wherein said interconnecting means defines a link lever operatively connected to each end of said link rod with each of said link levers being connected to one of said fence members.

7. The structure according to claim 1 wherein each said table extensions and fence supports have a guide channel assembled therebetween defining a raceway for guiding said link rod during its linear movement by said support arm.

8. The structure according to claim 1 wherein said guide means includes locking linkage operatively connected thereto for selectively locating said fence members into locking engagement with said fence supports.

9. The structure according to claim 1 wherein one of said table extensions has an extendable wing operatively associated therewith for accommodating elongated workpieces of excessive length.

* * * * *